(12) United States Patent
Appel et al.

(10) Patent No.: US 12,159,238 B2
(45) Date of Patent: Dec. 3, 2024

(54) AUTOMATED MACHINE LEARNING MODEL SELECTION

(71) Applicant: International Business Machines Corporation, Armonk, NY (US)

(72) Inventors: Ana Paula Appel, Sao Paulo (BR); Renato Luiz de Freitas Cunha, Sao Paulo (BR); Bruno Silva, Sao Paulo (BR); Paulo Rodrigo Cavalin, Rio de Janeiro (BR)

(73) Assignee: International Business Machines Corporation, Armonk, NY (US)

( * ) Notice: Subject to any disclaimer, the term of this patent is extended or adjusted under 35 U.S.C. 154(b) by 952 days.

(21) Appl. No.: 17/118,301

(22) Filed: Dec. 10, 2020

(65) Prior Publication Data

US 2022/0188663 A1 Jun. 16, 2022

(51) Int. Cl.
*G06N 5/04* (2023.01)
*G06F 9/50* (2006.01)
*G06N 20/00* (2019.01)

(52) U.S. Cl.
CPC ............. *G06N 5/04* (2013.01); *G06F 9/5027* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 7,904,397 B2 | 3/2011 | Fan | |
| 10,318,882 B2 | 6/2019 | Brueckner | |
| 10,417,575 B2 | 9/2019 | Nowozin et al. | |
| 10,614,361 B2 | 4/2020 | Chung | |
| 11,763,154 B1 * | 9/2023 | Lupesko | G06N 20/20 706/12 |
| 2018/0089593 A1 * | 3/2018 | Patel | G06F 30/00 |
| 2019/0354837 A1 | 11/2019 | Zhou | |

(Continued)

FOREIGN PATENT DOCUMENTS

| | | |
|---|---|---|
| CN | 101782976 B | 4/2013 |
| CN | 110443165 A | 11/2019 |
| EP | 3543917 A1 | 9/2019 |

(Continued)

OTHER PUBLICATIONS

Mammadli et al., The Art of Getting Deep Neural Networks in Shape, ACM Transactions on Architecture and Code Optimization, vol. 15, No. 4, Article 62. Publication date: Jan. 2019; pp. 62:1-62:21 (Year: 2019).*

(Continued)

*Primary Examiner* — Alan Chen
(74) *Attorney, Agent, or Firm* — Jeffrey Ingalls

(57) ABSTRACT

An approach to identifying architectures of machine learning models meeting a user defined constraint. The approach can receive input associated with evaluating machine learning models from a user. The approach can determine acceptable architectural templates to evaluate the machine learning models based on the input and determine a list of architectures and metrics based on a calculation of maximum neural network sizes of the acceptable architectural templates not exceeding the constraint. The approach can send the list of architectures and metrics to the user for selection.

20 Claims, 6 Drawing Sheets

(56) References Cited

U.S. PATENT DOCUMENTS

2021/0125197 A1* 4/2021 Lopuch .............. G06Q 30/0201
2023/0042397 A1* 2/2023 Yu ............................ G06N 3/09

FOREIGN PATENT DOCUMENTS

WO 2012005611 A1 1/2012
WO 2017176356 A2 10/2017

OTHER PUBLICATIONS

Elsken et al., Efficient Multi-Objective Neural Architecture Search Via Lamarckian Evolution, arXiv:1804.09081v4 [stat. ML] Feb. 26, 2019; pp. 1-23 (Year: 2019).*
Fedorov et al., SpArSe: Sparse Architecture Search for CNNs on Resource-Constrained Microcontrollers, 33rd Conference on Neural Information Processing Systems (NeurIPS 2019), Vancouver, Canada; pp. 1-13 (Year: 2019).*
Ghamizi et al., Automated Search for Configurations of Deep Neural Network Architectures, arXiv:1904.04612v1 [cs.LG] Apr. 9, 2019, pp. 1-18 (Year: 2019).*
Lu et al., On Neural Architecture Search for Resource-Constrained Hardware Platforms, arXiv:1911.00105v1 [cs.LG] Oct. 31, 2019; Total pp. 8 (Year: 2019).*
Strubell et al., Energy and Policy Considerations for Deep Learning in NLP, arXiv:1906.02243v1 [cs.CL] Jun. 5, 2019; Total pp. 6 (Year: 2019).*
Zhang et al., Dynamic Energy—Aware Capacity Provisioning for Cloud Computing Environments, ICAC'12, Sep. 18-20, 2012, San Jose, California, USA; pp. 145-154 (Year: 2012).*
"Automated Machine Learning Market is Forecasted to Post $14,511.9 Million by 2030: P&S Intelligence", GlobeNewswire, Feb. 11, 2020, 2 pages, <https://www.globenewswire.com/news-release/2020/02/11/1982792/0/en/Automated-Machine-Learning-Market-is-Forecasted-to-Post-14-511-9-Million-by-2030-P-S-Intelligence.html>.
Cai et al., "Model Slicing for Supporting Complex Analytics with Elastic Inference Cost and Resource Constraints", Proceedings of the VLDB Endowment, vol. 13, No. 2, arXiv:1904.01831v2 [cs.LG], Oct. 8, 2019, 14 pages, <https://doi.org/10.14778.3364324.3364325>.
Chen et al., "BudgetNet: Neural Network Inference under Dynamic Budget Constraints", Association for the Advancement of Artificial Intelligence, 2020, 6 pages.
Economic Graph Team, "Linkedin Workforce Report | United States | Aug. 2018", Linkedin, Aug. 10, 2018, 16 pages.
Escalante et al., "AutoML @ NeurIPS 2018 challenge: Design and Results", arXiv:1903.05263v2 [cs.LG], Mar. 14, 2019, 19 pages.
Garrett, Whitney, "2020 machine learning predictions and the shortage of data scientists", Algorithmia, Jan. 28, 2020, 5 pages, <https://algorithmia.com/blog/2020-machine-learning-predictions-and-the-shortage-of-data-scientists>.
Hurst, Aaron, "The 3 factors preventing successful AI adoption, according to IBM's GM", Information Age, Nov. 20, 2019, 8 pages, <https://www.information-age.com/the-3-factors-preventing-successful-ai-adoption-according-to-ibms-gm-123486157/>.
Jung et al., "Hardware Implementation of a Real-Time Neural Network Controller With a DSP and an FPGA for Nonlinear Systems", IEEE Transactions on Industrial Electronics, vol. 54, No. 1, Feb. 2007, pp. 265-271.
Li et al., "Budgeted Training: Rethinking Deep Neural Network Training Under Resource Constraints", Published as a conference paper at ICLR 2020, 20 pages.
Madabushi, Raghuram, "Neural Network / Machine Learning in resource constrained environments", Linkedin, downloaded from the internet on Oct. 29, 2020, 6 pages, <https://www.linkedin.com/pulse/neural-network-machine-learning-resource-constrained-madabushi>.
Mell et al., "The NIST Definition of Cloud Computing", Recommendations of the National Institute of Standards and Technology, Special Publication 800-145, Sep. 2011, 7 pages.
Miller III, W. Thomas, "Real-Time Neural Network Control of a Biped Walking Robot", IEEE Control Systems, Feb. 1994, pp. 41-48.
Raghavan, SRIRAM, "2020 AI Predictions from IBM Research", IBM, Dec. 17, 2019, 6 pages, <https://www.ibm.com/blogs/research/2019/12/2020-ai-predictions/>.
Ramanan et al., "Increasing performance and reducing the cost of MXNet inference using Amazon SageMaker Neo and Amazon Elastic Inference", AWS Machine Learning Blog, Mar. 31, 2020, 12 pages, <https://aws.amazon.com/blogs/machine-learning/increasing-performance-and-reducing-the-cost-of-mxnet-inference-using-amazon-sagemaker-neo-and-amazon-elastic-inference/>.
Regkas, George, "Empowering Citizen Data Scientists with IBM Watson AutoAI", Towards Data Science, May 18, downloaded from the internet on Oct. 29, 2020, 11 pages, <https://towardsdatascience.com/empowering-citizen-data-scientists-with-watson-autoai-49a087df99e5>.
Singer, Andrew, "Is AutoML the Answer to the Data Science Skills Shortage?", InformationWeek, May 10, 2019, 7 pages, <https://www.informationweek.com/strategic-cio/team-building-and-staffing/is-automl-the-answer-to-the-data-science-skills-shortage/a/d-id/1334637>.
Wang et al., "AutoAI: Automating the End-to-End AI Lifecycle with Humans-in-the-Loop", 25th International Conference on Intelligent User Interfaces Companion (IUI '20 Companion), Mar. 17-20, 2020, Cagliari, Italy, 2 pages.
Xiong, et al., "Resource Constrained Neural Network Architecture Search: Will a Submodularity Assumption Help?", In Proceedings of the IEEE International Conference on Computer Vision, 2019, pp. 1901-1910.
Yang et al., "Designing Energy-Efficient Convolutional Neural Networks using Energy-Aware Pruning", arXiv:1611.05128v4 [cs.CV], Apr. 18, 2017, 9 pages.
Yang et al., "Netadapt: Platform-Aware Neural Network Adaptation for Mobile Applications", In Proceedings of the European Conference on Computer Vision (ECCV), 2018, 16 pages.

* cited by examiner

| Type / Stride | Filter Shape | Input Size |
|---|---|---|
| Conv / s2 | 3 x 3 x 3 x 32 | 224 x 224 x 3 |
| Conv dw / s1 | 3 x 3 x 32 dw | 112 x 112 x 32 |
| Conv / s1 | 1 x 1 x 32 x 64 | 112 x 112 x 32 |
| Conv dw / s2 | 3 x 3 x 64 dw | 112 x 112 x 64 |
| Conv / s1 | 1 x 1 x 64 x 128 | 56 x 56 x 64 |
| Conv dw / s1 | 3 x 3 x 128 dw | 56 x 56 x 128 |
| Conv / s1 | 1 x 1 x 128 x 128 | 56 x 56 x 128 |
| Conv dw / s2 | 3 x 3 x 128 dw | 56 x 56 x 128 |
| Conv / s1 | 1 x 1 x 128 x 256 | 28 x 28 x 128 |
| Conv dw / s1 | 3 x 3 x 256 dw | 28 x 28 x 256 |
| Conv / s1 | 1 x 1 x 256 x 256 | 28 x 28 x 256 |
| Conv dw / s2 | 3 x 3 x 256 dw | 28 x 28 x 256 |
| Conv / s1 | 1 x 1 x 256 x 512 | 14 x 14 x 256 |
| 5x Conv dw / s1<br>Conv / s1 | 3 x 3 x 512 dw<br>1 x 1 x 512 x 512 | 14 x 14 x 512<br>14 x 14 x 512 |
| Conv dw / s2 | 3 x 3 x 512 dw | 14 x 14 x 512 |
| Conv / s1 | 1 x 1 x 512 x 1024 | 7 x 7 x 512 |
| Conv dw / s2 | 3 x 3 x 1024 dw | 7 x 7 x 1024 |
| Conv / s1 | 1 x 1 x 1024 x 1024 | 7 x 7 x 1024 |
| Avg Pool / s1 | Pool 7 x 7 | 7 x 7 x 1024 |
| FC / s1 | 1024 x 1000 | 1 x 1 x 1024 |
| Softmax / s1 | Classifier | 1 x 1 x 1000 |

FIG. 7

AUTOMATED MACHINE LEARNING MODEL SELECTION

TECHNICAL FIELD

The present invention relates generally to machine learning, and more specifically, to selecting a machine learning model based on model inference time.

BACKGROUND

Training machine learning models and subsequently running inference on the trained machine learning models is currently treated as a black box by most users, with the exception of users with deep knowledge of the inner workings of algorithms associated with the machine learning models. The problem with this approach is that users do not know how long their machine learning models will take to run at inference time and, accordingly, the users do not know how much it will cost to run the selected machine learning models. Similarly, the time and associated cost to train the selected machine learning models is also treated as a black box. When machine learning models are deployed at scale, this is a problem, because the machine learning models can be too costly to execute, either because they take too long to run, or because they require large amounts of computational resources.

BRIEF SUMMARY

According to an embodiment of the present invention, a computer-implemented method for identifying architectures of machine learning models meeting a user defined constraint, the computer-implemented method comprising: receiving, by one or more processors, input associated with evaluating machine learning models from a user; determining, by the one or more processors, acceptable architectural templates to evaluate the machine learning models based on the input; determining, by the one or more processors, a first list of architectures and metrics based on a calculation of maximum neural network sizes of the acceptable architectural templates not exceeding the constraint; and sending, by the one or more processors, the first list of architectures and metrics to the user for selection.

According to an embodiment of the present invention, a computer program product for identifying architectures of machine learning models meeting a user defined constraint, the computer program product comprising: one or more non-transitory computer readable storage media and program instructions stored on the one or more non-transitory computer readable storage media, the program instructions comprising: program instructions to receive input associated with evaluating machine learning models from a user; program instructions to determine acceptable architectural templates to evaluate the machine learning models based on the input; program instructions to determine a first list of architectures and metrics based on a calculation of maximum neural network sizes of the acceptable architectural templates not exceeding the constraint; and program instructions to send the first list of architectures and metrics to the user for selection.

According to an embodiment of the present invention, a computer system for identifying architectures of machine learning models meeting a user defined constraint, the computer system comprising: one or more computer processors; one or more computer readable storage media; and program instructions stored on the one or more computer readable storage media for execution by at least one of the one or more processors, the program instructions comprising: program instructions to receive input associated with evaluating machine learning models from a user; program instructions to determine acceptable architectural templates to evaluate the machine learning models based on the input; program instructions to determine a first list of architectures and metrics based on a calculation of maximum neural network sizes of the acceptable architectural templates not exceeding the constraint; and program instructions to send the first list of architectures and metrics to the user for selection.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 7 is an exemplary table of an architecture body, according to embodiments of the present invention.

DETAILED DESCRIPTION

Figure 1:
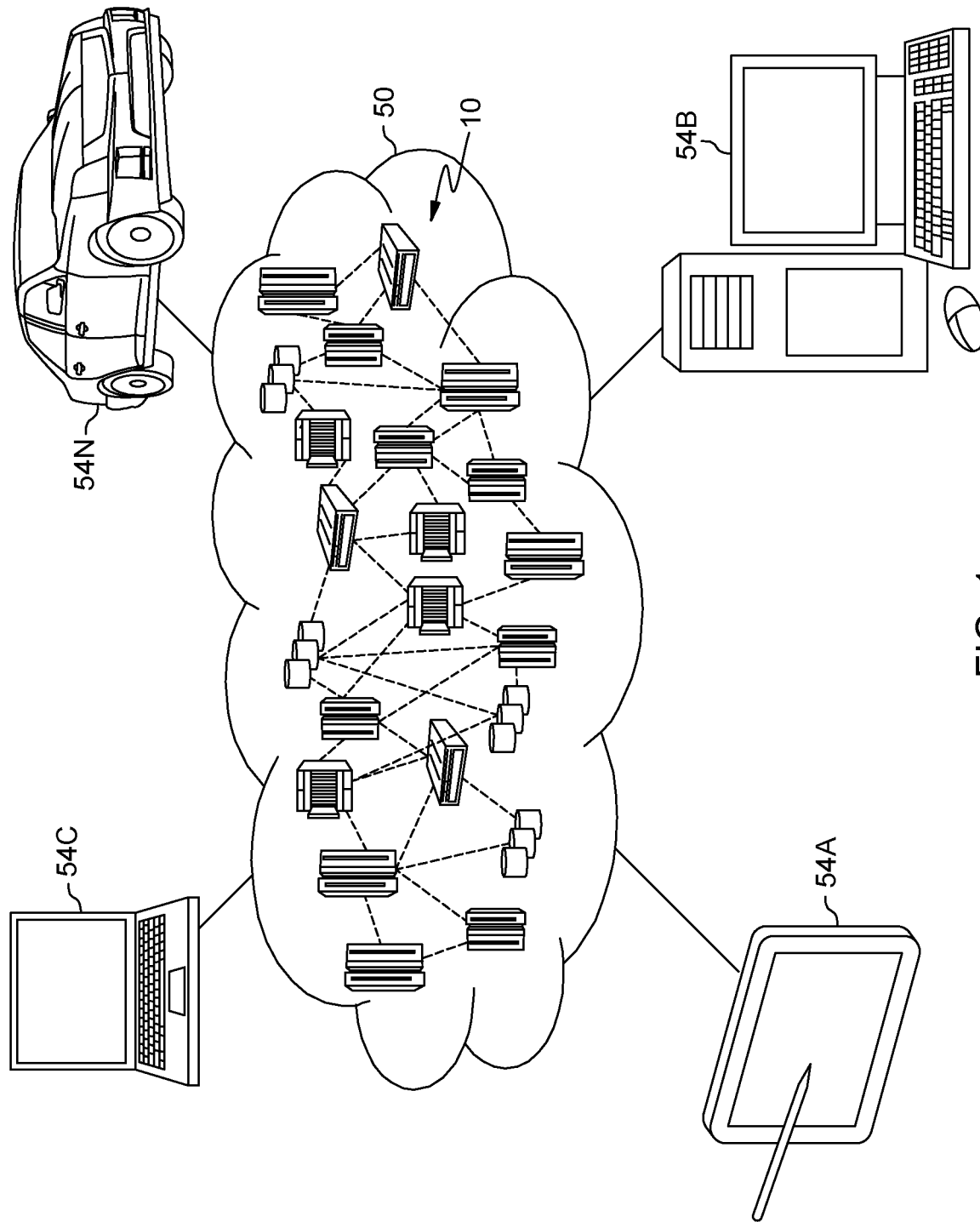
FIG. 1 depicts a cloud computing environment, according to embodiments of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several embodiments of selecting a machine learning model based on model inference time. It should be noted that the term software, as used herein, includes any type of computer instructions such as, but not limited to, firmware, microcode, etc.

Embodiments of the present invention can provide a technique of performing an architecture search for machine learning models while respecting constraints provided by users, when combined with knowledge about performing the user's desired task.

Embodiments of the present invention can determine an inference time of an employed machine learning model. An important aspect of any neural network architecture and, by extension, any matrix-multiplication learning algorithm, such as, but not limited to, Linear Regression, Logistic Regression, the Chimera-STF algorithm, soft-margin SVM with gradient descent and boosting/bagging techniques that use any of these components as building blocks is that, once the architecture is fixed, inference time can be precisely determined.

Precisely determining inference time derives from the fact that, for any of the aforementioned models, after they are trained, inference consists of performing a forward-pass through the model, which consists of a series of matrix multiplies, even for Convolutional Neural Network (CNN) Architectures, and Recurrent Neural Network (RNN) Architectures. For RNNs, in particular, time will depend on the number of time steps used for unrolling the RNN. Accordingly, commonly the number of time steps is not unbounded and, therefore, once the maximum number of steps is defined, the time taken to perform such unrolling becomes deterministic.

Analogous reasoning can be applied to other gradient-descent-based algorithms, such as soft-margin SVM, which models an ideal perceptron, Linear Regression, Logistic Regression, and techniques that enable collaborative filtering, such as matrix factorization.

When deployed, inference operations of these models will take a fixed time that depends on the capacity of the model, which, in practice, is related to the sizes of the model's composite matrices. Accordingly, an embodiment can bound the average cost of a single prediction, irrespective of whether the deployment model is a cloud deployment model or an on-premise deployment model.

Embodiments of the present invention can calibrate a machine learning model for the type of computing resource prior to operation. Calibration collects information associated with different resources running different operations and different performance characteristics. In one general embodiment, a computer-implemented method includes receiving input associated with evaluating machine learning models from a user, determining acceptable architectural templates to evaluate the machine learning models based on the input, determining a first list of architectures and metrics based on a calculation of maximum neural network sizes of the acceptable architectural templates not exceeding the constraint and sending the first list of architectures and metrics to the user for selection. It should be noted that not exceeding the constraint can include not exceeding the constraint by a predetermined threshold.

In another general embodiment, a system includes a processor and logic integrated with the processor, executable by the processor, or integrated with and executable by the processor. The logic is configured to perform the foregoing computer-implemented method.

In another general embodiment, a computer program product for install-time software validation includes a computer-readable storage medium having program instructions embodied therewith. The program instructions are executable by a computer to cause the computer to perform the foregoing computer-implemented method.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
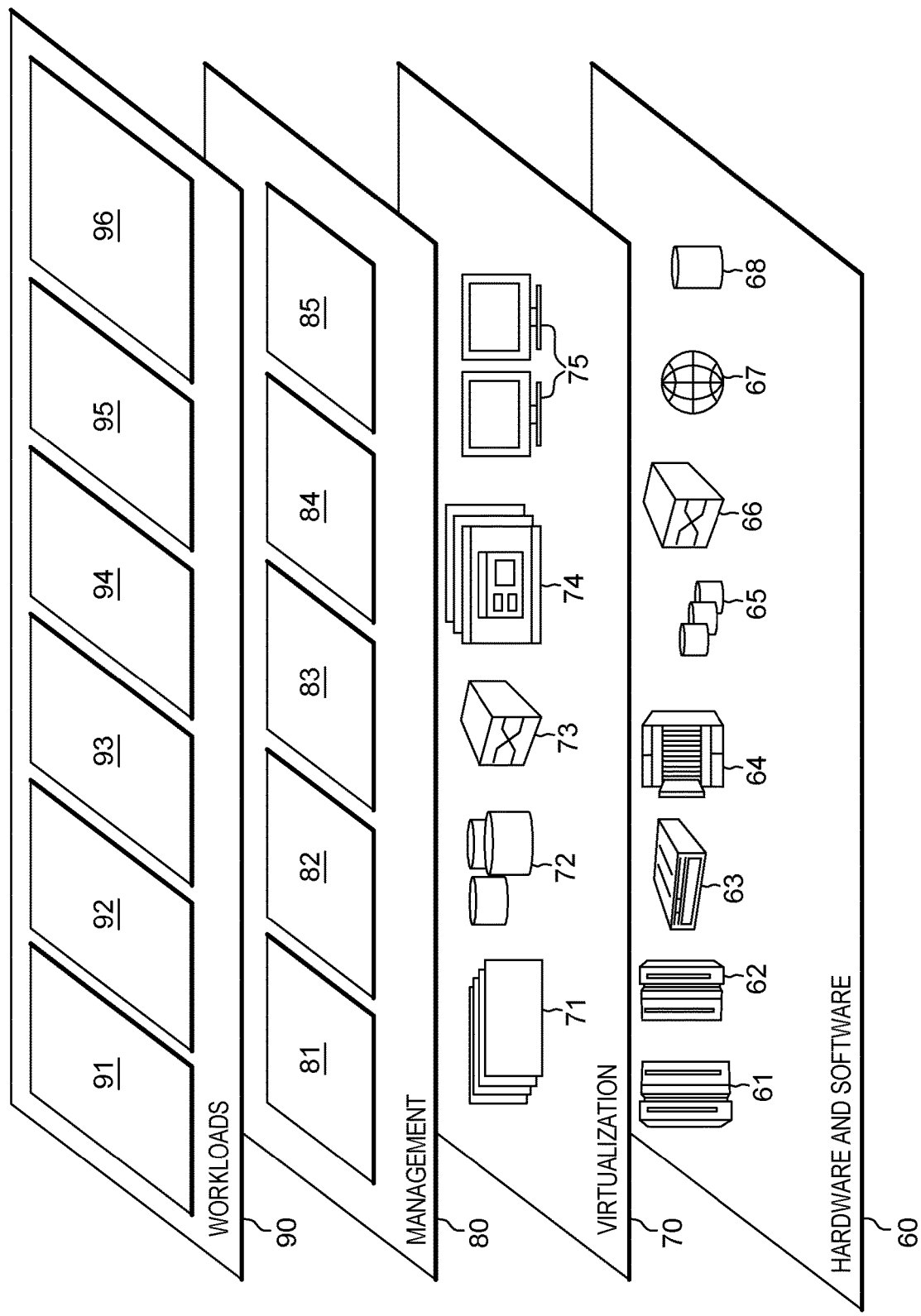
FIG. 2 depicts abstraction model layers, according to embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 include hardware and software components. Examples of hardware components include mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include mapping and navigation 91; software development and lifecycle management 92; virtual classroom education delivery 93; data analytics processing 94; transaction processing 95; and machine learning model selection based on inference time 96.

It should be noted that the embodiments of the present invention may operate with a user's permission. Any data may be gathered, stored, analyzed, etc., with a user's consent. In various configurations, at least some of the embodiments of the present invention are implemented into an opt-in application, plug-in, etc., as would be understood by one having ordinary skill in the art upon reading the present disclosure.

Figure 3:
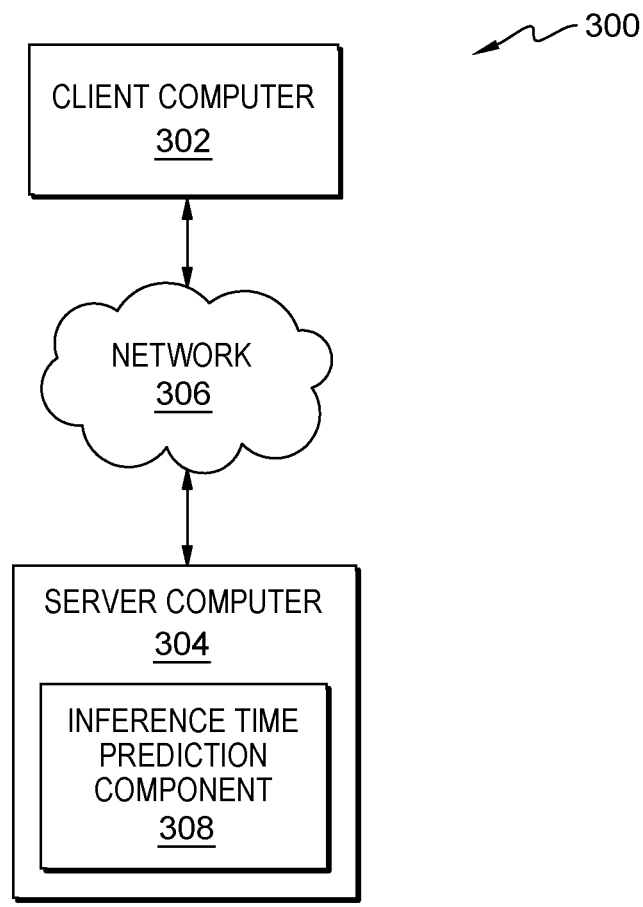
FIG. 3 is a high-level architecture, according to embodiments of the present invention.
Figure 4:
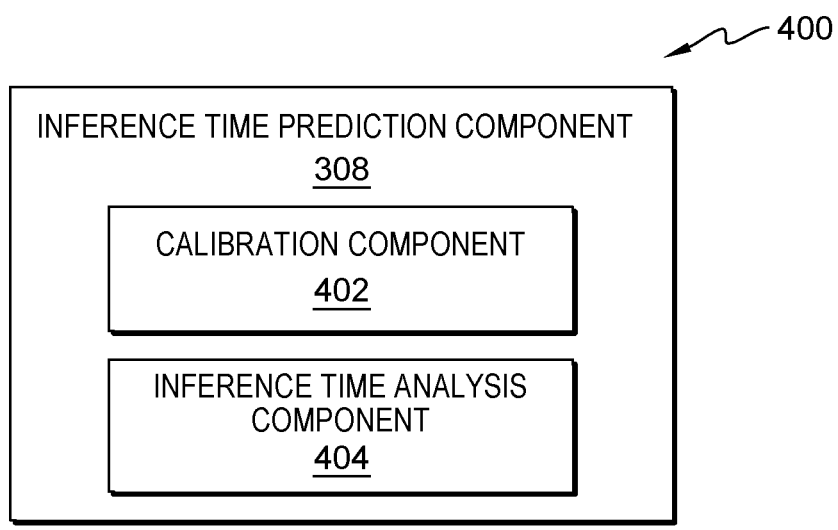
FIG. 4 is an exemplary detailed architecture, according to embodiments of the present invention.
Figure 5:
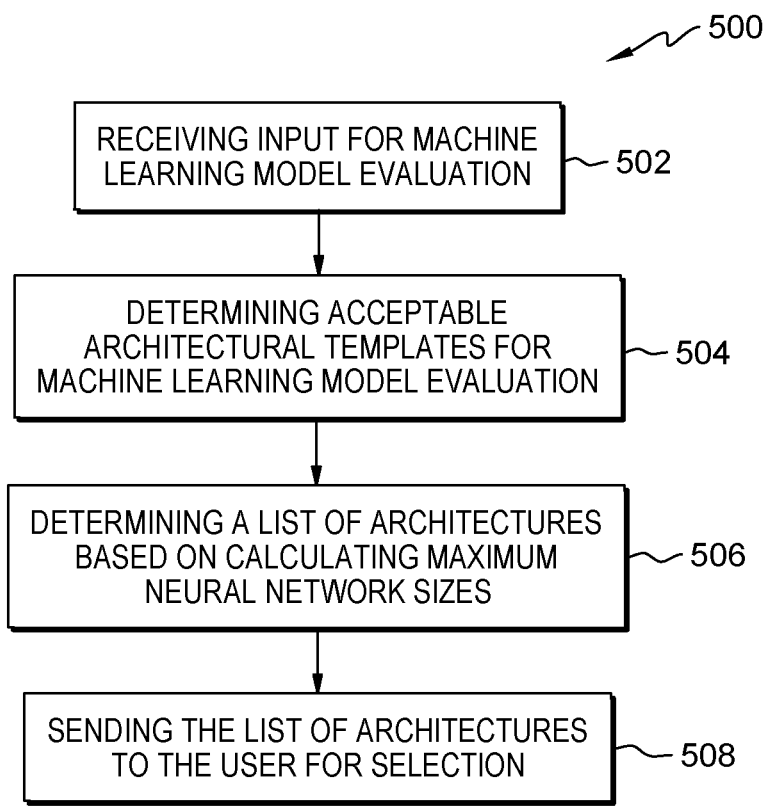
FIG. 5 is a flowchart of a method, according to embodiments of the present invention.

FIG. 3 is a high-level architecture for performing various operations of FIG. 5, in accordance with various embodiments. The architecture 300 may be implemented in accordance with the present invention in any of the environments depicted in FIGS. 1-4, among others, in various embodiments. Of course, more or less elements than those specifically described in FIG. 3 may be included in architecture 300, as would be understood by one of ordinary skill in the art upon reading the present descriptions.

Each of the steps of the method 500 (described in further detail below) may be performed by any suitable component of the architecture 300. A processor, e.g., processing circuit(s), chip(s), and/or module(s) implemented in hardware and/or software, and preferably having at least one hardware component may be utilized in any device to perform one or more steps of the method 500 in the architecture 300. Illustrative processors include, but are not limited to, a central processing unit (CPU), an application specific integrated circuit (ASIC), a field programmable gate array (FPGA), etc., combinations thereof, or any other suitable computing device known in the art.

Architecture 300 includes a block diagram showing an exemplary processing system for predicting inference time for a machine learning model environment to which the invention principles may be applied. The architecture 300 comprises a client computer 302, an inference time prediction component 308 operational on a server computer 304 and a network 306 supporting communication between the client computer 302 and the server computer 304.

Client computer 302 can be any computing device on which software is installed for which an update is desired or required. Client computer 302 can be a standalone computing device, management server, a web server, a mobile computing device, or any other electronic device or computing system capable of receiving, sending, and processing data. In other embodiments, client computer 302 can represent a server computing system utilizing multiple computers as a server system. In another embodiment, client computer 302 can be a laptop computer, a tablet computer, a netbook computer, a personal computer, a desktop computer or any programmable electronic device capable of communicating with other computing devices (not shown) within user persona generation environment via network 306.

In another embodiment, client computer 302 represents a computing system utilizing clustered computers and components (e.g., database server computers, application server computers, etc.) that act as a single pool of seamless resources when accessed within install-time validation environment of architecture 300. Client computer 302 can include internal and external hardware components, as depicted and described in further detail with respect to FIG. 5.

Server computer 304 can be a standalone computing device, management server, a web server, a mobile computing device, or any other electronic device or computing system capable of receiving, sending, and processing data. In other embodiments, server computer 304 can represent a server computing system utilizing multiple computers as a server system. In another embodiment, server computer 304 can be a laptop computer, a tablet computer, a netbook computer, a personal computer, a desktop computer, or any programmable electronic device capable of communicating with other computing devices (not shown) within install-time validation environment of architecture 300 via network 306.

Network 306 can be, for example, a local area network (LAN), a wide area network (WAN) such as the Internet, or a combination of the two, and can include wired, wireless, or fiber optic connections. In general, network 306 can be any combination of connections and protocols that will support communications between client computer 302 and server computer 304.

Inference time prediction component 308, operational on server computer 304, can perform a calibration to allow for different operations associated with different computing environments. Embodiments of the present invention can calibrate based on factors such as, but not limited to, input types, task types and architecture types. In another aspect, inference time prediction component 308 can perform an analysis based on factors such as but not limited to, a time complexity for available neural networks and a type of task being implemented based on splitting an associated neural network in a body and head paradigm. It should be noted that inference time prediction component can also recommend the relaxation of constraints to meet the processing objectives.

FIG. 4 is an exemplary detailed architecture for performing various operations of FIG. 5, in accordance with various embodiments. The architecture 400 may be implemented in accordance with the present invention in any of the environments depicted in FIGS. 1-3 and 5, among others, in various embodiments. Of course, more or less elements than those specifically described in FIG. 4 may be included in architecture 400, as would be understood by one of skill in the art upon reading the present descriptions.

Each of the steps of the method 500 (described in further detail below) may be performed by any suitable component of the architecture 400. A processor, e.g., processing circuit(s), chip(s), and/or module(s) implemented in hardware and/or software, and preferably having at least one hardware component, may be utilized in any device to perform one or more steps of the method 500 in the architecture 400. Illustrative processors include, but are not limited to, a central processing unit (CPU), an application specific integrated circuit (ASIC), a field programmable gate array (FPGA), etc., combinations thereof, or any other suitable computing device known in the art.

Architecture 400 provides a detailed view of at least some of the modules of architecture 300. Architecture 400 can comprise an inference time prediction component 308, which can further comprise a calibration component 402 and an inference time analysis component 404.

The calibration component 402 can use input from an administrator to provide the information necessary to analyze resource performance for the resources available in a resource pool. In one aspect of an embodiment, an administrator can define a pool of resources to employ for the operation. In another aspect of an embodiment, an administrator can configure the types of tasks to be performed. In another aspect, an administrator can define a list of supported base architecture templates.

Once an administrator has defined and configured the scope of the calibration, calibration component 402 can calibrate performance for the resource types in the pool of resources. For example, calibration component 402 can iterate through the permutations of resources measuring execution times for resources in the pool of resources to complete calibrations tasks. In this manner, calibration component 402 can maintain a time-based performance list of for the resource types.

Inference time analysis component 404 can analyze standard neural networks based on determining an execution time cost for a given network by determining a time to execute individual blocks of the applicable neural network. Inference time analysis component 404 can then sum the times for the individual blocks of the neural network to obtain the performance time for the neural network. It should be noted that once an architecture is selected, execution time for the selected architecture can be determined by inference time analysis component 404 as a function of the input sizes and hyper parameters of the selected machine learning model.

For example, fully connected layers in the selected architecture can be implemented as a matrix multiplication followed by an activation function. Multiplying a matrix "A" of "m" lines by "n" columns, by a matrix "B" of "n" lines by "k" columns can be computed as the product O equal to "m"×"n"×"k." Accordingly, inference time analysis component 404 can find the constants to compute the complexity of the multiplications. The activation functions of the fully connected layer can operate over the entries of the output matrix as the product O equal to "m"×"n" for "m" by "n" matrices. Further, two dimensional convolutions of an image of "M" by "N" pixels with a square kernel of side "k" can be the product O as "M"×"N"×"k"×"k." Accordingly, inference time analysis component 404 can determine the type of algorithm used to implement the various building blocks and can compute the complexity of entire neural network architectures.

Inference time analysis component 404 can split neural networks into two parts, a body, and a head. The body can be considered a feature extractor, while the head can be the component that uses the features extracted by the body to implement the task at hand.

For example, in an image classification task implemented with a deep convolutional neural network, the body can be the set of convolutional and pooling layers that precede the fully connected layers. In an example "MobileNet" architecture 700 of FIG. 7, the body comprises rows "Conv/s2" 702 layer to "Avg Pool/s1" 704 layer. Inference time analysis component 404 can determine a format for the head as a function of the task to be solved, e.g., simple regression problems can have a single output that is a function of the number of independent variables being regressed. Similarly, classification problems can have a "SoftMax" 706 output with dimensionality equal to the number of classes being output while sequence generation tasks can have either a recurrent layer as output or a number of outputs equal to the number length of the maximum sequence to be generated by the neural network. Analogously, the body can be determined by the type of input data, although this can employ a heuristic method, because there is room for experimentation with inputs. Accordingly, for each input data type, inference time analysis component 404 can determine a mapping between tasks and bodies, for selecting appropriate architectures. It should be noted that at a high level, the relationship between input, output and architectures can be summarized as one-to-one, one-to-many, many-to-one or variations of many-to-many.

Inference time analysis component 404 can receive a user request of the task to be performed (e.g., classification, regression, etc.), the input type, the output type, and the data sample. Inference time analysis component 404 can find templates to solve the task. Based on the input, output and task types, inference time analysis component 404 can determine a set of actions that can be applied to the input dataset to perform the requested task. For example, if the dataset is composed of images, a set of data augmentation actions can be applied to the dataset. Further, the type of input data can also define a set of building blocks that can be used. For example, if images of arbitrary size can be input, it will be impractical to use fully connected nodes as input, since fully connected nodes require a fixed size.

Inference time analysis component 404 can receive input of the time or currency budget for inference. If the budget is in currency, Inference time analysis component 404 can convert the determined time to currency for comparison. Inference time analysis component 404 can find architectures meeting the user budget constraints. Inference time analysis component 404 can present a list of architectures and their respective metrics (e.g., accuracy, inference time, or inference cost) that can be selected. It should be noted that inference cost can comprise the monetary cost of processing time on a computing platform.

Inference time analysis component 404 can request a redefinition of the constraints for the architecture finding process if none of the presented architectures are selected. Further, inference time analysis component 404 can compute additional architectures with the shortest distances to the desired metrics and propose a recommendation to relax or reduce some of the constraints to accomplish the desired task.

FIG. 5 is an exemplary flowchart of a method 500 for identifying architectures of machine learning models meeting a user defined constraint. At step 502, an embodiment can receive, via inference time prediction component 308, input for machine learning model evaluation. At step 504, the embodiment can determine, via inference time prediction component 308, acceptable architectural templates for machine learning model evaluation. At step 506, the embodiment can determine, via inference time prediction component 308, a list of architectures based on calculating maximum neural network sizes. At step 508, the embodiment can send, via inference time prediction component 308, the list of architectures for selection.

Figure 6:
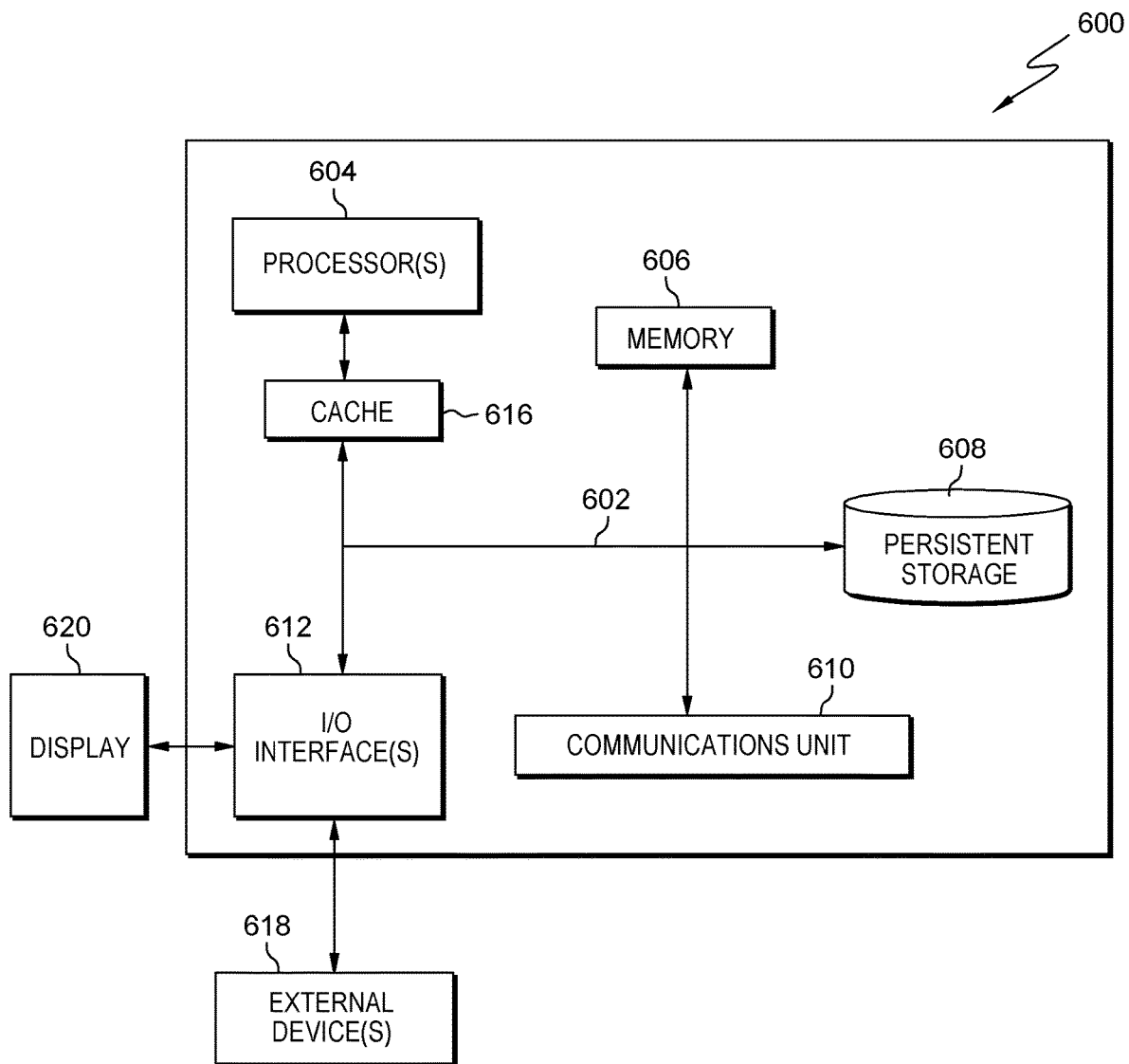
FIG. 6 is a block diagram of internal and external components of a data processing system in which embodiments described herein may be implemented, according to embodiments of the present invention.

FIG. 6 depicts computer system 600, an example computer system representative of client computer 302 and server computer 304. Computer system 600 includes communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Computer system 600 includes processors 604, cache 616, memory 606, persistent storage 608, communications unit 610, input/output (I/O) interface(s) 612 and communications fabric 602. Communications fabric 602 provides communications between cache 616, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses or a crossbar switch.

Memory 606 and persistent storage 608 are computer readable storage media. In this embodiment, memory 606 includes random access memory (RAM). In general, memory 606 can include any suitable volatile or non-volatile computer readable storage media. Cache 616 is a fast memory that enhances the performance of processors 604 by holding recently accessed data, and data near recently accessed data, from memory 606.

Program instructions and data used to practice embodiments of the present invention may be stored in persistent storage 608 and in memory 606 for execution by one or more of the respective processors 604 via cache 616. In an embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices. In these examples, communications unit 610 includes one or more network interface cards. Communications unit 610 may provide communications through the use of either or both physical and wireless communications links. Program instructions and data used to practice embodiments of the present invention may be downloaded to persistent storage 608 through communications unit 610.

I/O interface(s) 612 allows for input and output of data with other devices that may be connected to each computer system. For example, I/O interface 612 may provide a connection to external devices 618 such as a keyboard, keypad, a touch screen, and/or some other suitable input device. External devices 618 can also include portable computer readable storage media such as, for example, thumb drives, portable optical or magnetic disks, and memory cards. Software and data used to practice embodiments of the present invention can be stored on such portable computer readable storage media and can be loaded onto persistent storage 608 via I/O interface(s) 612. I/O interface(s) 612 also connect to display 620.

Display 620 provides a mechanism to display data to a user and may be, for example, a computer monitor.

The components described herein are identified based upon the application for which they are implemented in a specific embodiment of the invention. However, it should be appreciated that any particular component nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for identifying architectures of machine learning models meeting a user defined constraint, the computer-implemented method comprising:
   receiving, by one or more processors, input associated with evaluating machine learning models from a user;
   determining, by the one or more processors and using an inference time prediction component including a calibration component and an inference time analysis component, acceptable architectural templates to evaluate the machine learning models based on the input, wherein the determining of the acceptable architectural templates includes calibrating, with the calibration component, the performance of resource types associated with a pool of available resources by iterating through the permutations of the available resources measuring execution times for the resources;
   determining, by the one or more processors, a first list of architectures and metrics based on a calculation of maximum neural network sizes of the acceptable architectural templates not exceeding the constraint, wherein the constraint is a monetary cost; and
   sending, by the one or more processors, the first list of architectures and metrics to the user for selection.

2. The computer-implemented method of claim 1, further comprising:
   determining, by the one or more processors, a second list of architectures and metrics based on a calculation of maximum neural network sizes of the acceptable architectural templates not exceeding the constraint by more than a predetermined threshold; and
   sending, by the one or more processors, the second list of architectures and metrics to the user for selection.

3. The computer-implemented method of claim 1, wherein the input comprises a task, input types, output types, a dataset and a constraint.

4. The computer-implemented method of claim 1, wherein the constraint further comprises a time limit for completing a task.

5. The computer-implemented method of claim 1, wherein the metrics comprise task solution accuracy, inference time and inference monetary cost.

6. The computer-implemented method of claim 1, wherein the metrics comprise a recommendation of an amount to reduce the constraint to accomplish a task.

7. The computer-implemented method of claim 1, further comprising analyzing, with the interference time analysis component, a neural network based on determining an execution time cost for a given network by determining a time to execute individual blocks of the applicable neural network and then summing the execution times for the individual blocks of the neural network to obtain a performance time for the neural network.

8. A computer program product for identifying architectures of machine learning models meeting a user defined constraint, the computer program product comprising:
   one or more non-transitory computer readable storage media and program instructions stored on the one or more non-transitory computer readable storage media, the program instructions comprising:
   program instructions to receive input associated with evaluating machine learning models from a user;
   program instructions to determine, using an inference time prediction component including a calibration component and an inference time analysis component, acceptable architectural templates to evaluate the machine learning models based on the input, wherein the determining of the acceptable architectural templates includes calibrating, with the calibration component, the performance of resource types associated with a pool of available resources by iterating through the permutations of the available resources measuring execution times for the resources;

program instructions to determine a first list of architectures and metrics based on a calculation of maximum neural network sizes of the acceptable architectural templates not exceeding the constraint, wherein the constraint is a monetary cost; and program instructions to send the first list of architectures and metrics to the user for selection.

9. The computer program product of claim 8, further comprising:

program instructions to determine a second list of architectures and metrics based on a calculation of maximum neural network sizes of the acceptable architectural templates not exceeding the constraint by more than a predetermined threshold; and program instructions to send the second list of architectures and metrics to the user for selection.

10. The computer program product of claim 8, wherein the input comprises a task, input types, output types, a dataset and a constraint.

11. The computer program product of claim 8, wherein the constraint further comprises a time limit for completing a task.

12. The computer program product of claim 8, wherein the metrics comprise task solution accuracy, inference time and inference monetary cost.

13. The computer program product of claim 8, wherein the metrics comprise a recommendation of an amount to reduce the constraint to accomplish a task.

14. The computer program product of claim 8, further comprising analyzing, with the interference time analysis component, a neural network based on determining an execution time cost for a given network by determining a time to execute individual blocks of the applicable neural network and then summing the execution times for the individual blocks of the neural network to obtain a performance time for the neural network.

15. A computer system for identifying architectures of machine learning models meeting a user defined constraint, the computer system comprising:
one or more computer processors;
one or more computer readable storage media; and
program instructions stored on the one or more computer readable storage media for execution by at least one of the one or more processors, the program instructions comprising:

program instructions to receive input associated with evaluating machine learning models from a user;

program instructions to determine, using an inference time prediction component including a calibration component and an inference time analysis component, acceptable architectural templates to evaluate the machine learning models based on the input, wherein the determining of the acceptable architectural templates includes calibrating, with the calibration component, the performance of resource types associated with a pool of available resources by iterating through the permutations of the available resources measuring execution times for the resources;

program instructions to determine a first list of architectures and metrics based on a calculation of maximum neural network sizes of the acceptable architectural templates not exceeding the constraint, wherein the constraint is a monetary cost; and program instructions to send the first list of architectures and metrics to the user for selection.

16. The computer system of claim 15, further comprising:

program instructions to determine a second list of architectures and metrics based on a calculation of maximum neural network sizes of the acceptable architectural templates not exceeding the constraint by more than a predetermined threshold; and program instructions to send the second list of architectures and metrics to the user for selection.

17. The computer system of claim 15, wherein the input comprises a task, input types, output types, a dataset and a constraint.

18. The computer system of claim 15, wherein the constraint further comprises a time limit for completing a task.

19. The computer system of claim 15, wherein the metrics comprise task solution accuracy, inference time, inference monetary cost and a recommendation of an amount to reduce the constraint to accomplish the task.

20. The computer system of claim 15, further comprising analyzing, with the interference time analysis component, a neural network based on determining an execution time cost for a given network by determining a time to execute individual blocks of the applicable neural network and then summing the execution times for the individual blocks of the neural network to obtain a performance time for the neural network.

* * * * *